US005453058A

United States Patent [19]
Reese et al.

[11] Patent Number: 5,453,058
[45] Date of Patent: Sep. 26, 1995

[54] HIGH CAPACITY PHASED CHAIN FOR USE IN CONTINUOUSLY VARIABLE TRANSMISSION WITH V-PULLEYS

[75] Inventors: Mark D. Reese, Seneca Falls, N.Y.; Kyr Gaganidze, Baltimore, Md.

[73] Assignee: Borg-Warner Automotive, Inc., Sterling Heights, Mich.

[21] Appl. No.: 235,695

[22] Filed: Apr. 29, 1994

[51] Int. Cl.⁶ .................................... F16G 1/24
[52] U.S. Cl. ............................. 474/206; 474/245
[58] Field of Search .................... 474/206, 201, 474/212–217, 237, 240, 242, 244, 245

[56] References Cited

U.S. PATENT DOCUMENTS

| | | |
|---|---|---|
| 4,313,730 | 2/1982 | Cole, Jr. et al. |
| 4,507,106 | 3/1985 | Cole, Jr. |
| 4,569,671 | 2/1986 | Ledvina. |
| 4,776,829 | 10/1988 | Yamamuro et al. |
| 4,911,682 | 3/1990 | Ivey et al. |
| 4,938,737 | 7/1990 | Yamamuro. |
| 4,993,999 | 2/1991 | Mott. |
| 5,007,883 | 4/1991 | Cole, Jr. et al. |
| 5,026,332 | 6/1991 | Mott et al. |
| 5,061,226 | 10/1991 | Mott. |
| 5,090,948 | 2/1992 | Orth. |
| 5,131,892 | 7/1992 | Mott. |
| 5,167,587 | 12/1992 | Mott. |
| 5,215,505 | 6/1993 | Sugimoto et al. |
| 5,318,485 | 6/1994 | Bateman ........................ 474/245 |
| 5,334,111 | 8/1994 | Cole, Jr. et al. .............. 474/245 X |

FOREIGN PATENT DOCUMENTS

| | | |
|---|---|---|
| 61-17744 | 1/1986 | Japan. |
| 62-258240 | 11/1987 | Japan. |
| 63-72941 | 4/1988 | Japan. |
| 1-169145 | 7/1989 | Japan. |
| 1-169146 | 7/1989 | Japan. |
| 1-115043 | 8/1989 | Japan. |
| 1-203733 | 8/1989 | Japan. |
| 1-136747 | 9/1989 | Japan. |
| 1-266338 | 10/1989 | Japan. |
| 1-316544 | 12/1989 | Japan. |
| 2-62445 | 3/1990 | Japan. |
| 2-118230 | 5/1990 | Japan. |

*Primary Examiner*—Michael Powell Buiz
*Attorney, Agent, or Firm*—Willian Brinks Hofer; Greg Dziegielewski

[57] ABSTRACT

A power transmission chain for a variable pulley transmission. The chain includes two half-chains placed side-by-side and offset by one-half pitch. Each half-chain has a plurality of interlaced inner links with each having a pair of depending toes to define a passageway to receive a strut that extends beyond the lateral width of the half-chain. A part of the portion of the strut extending beyond the one half-chain is substantially supported by a strut contact surface located adjacent the outer flank of the toes on the links of the other half-chain so that the strut is substantially fully supported across its full transverse width.

15 Claims, 4 Drawing Sheets

HIGH CAPACITY PHASED CHAIN FOR USE IN CONTINUOUSLY VARIABLE TRANSMISSION WITH V-PULLEYS

BACKGROUND OF THE INVENTION

The present invention relates to a chain especially adapted to connect the pulleys of a pulley transmission, particularly a variable pulley transmission. The chain includes two half-chains with each carrying a full-width strut. The half-chains are placed in a side-by-side relationship and offset from each other by one-haft the pitch distance so that half-chains are out of phase. The struts are interleaved with file free ends supported by the links of the opposing half-chain. It is expected that the offset of the half-chains will reduce the noise generation of the chain.

Variable pulley transmissions for transferring torque from an input or drive shaft to an output or driven shaft have been used for some time. In these transmissions, a first pulley constructed of a pair of sheaves or flanges is mounted on the input shaft such that at least one of its sheaves is axially movable with respect to its other sheave. A second, similarly constructed and adjustable pulley is mounted on the output shaft. A chain connects and transfers torque between the two pulleys when the input shaft is driven. As the effective diameter of one pulley is changed, the effective diameter of the other pulley is changed in the other direction and, the drive ratio between the input and output shafts is adjusted in a smooth, continuous manner.

In one type of variable pulley transmission chain, the chain links are provided in sets that are interleaved together. The links have aligned apertures for receiving pivot members. The pivot members can provide the means for the transfer of power between the chain and the sheaves of the pulley by allowing the sheaves to directly contact the ends of the pivot members in a driving engagement.

Load blocks or load carrying members that are positioned on the chain between the spaced pivot members can also provide the means for transfer of power between the pulleys. The load blocks can extend around the links of the chain and have one or more windows for receiving the chain links therein. The load blocks have tapered outer or end surfaces which engage the sheave faces of the pulleys to provide the driving engagement between the pulleys and the chain. Examples of such power transmission chains suitable for use in a continuously variable transmission are shown in U.S. Pat. Nos. 4,911,682 and 4,507,106.

Alternatively, the load blocks can be in the form of struts that are carried in a passageway below the links. An example of this type of chain is shown in U.S. Pat. Nos. 5,007,883 and 5,026,332. In this type of chain at least some links in some sets have toes or protrusions defining a passageway that receives power transmitting struts When the above transmission chains are used, noise is generated as the load blocks or struts contact the sides of the pulleys. Increasingly, however, consumers desire a more quiet environment. As a result, efforts have been directed to decrease the noise associated with the operation of the chain.

One solution has included using links of more than one pitch length, changing the length of the struts, and changing the length of the chain receiving windows. By altering these pulley engaging characteristics of the chain, the noise pattern associated with the operation of the chain is modified and becomes more acceptable.

Another solution has been to use two chains positioned in a side-by-side relationship and out of phase with respect to each other by one-half the pitch distance. An example of this type of chain is shown in U.S. Pat. No. 5,215,505 which shows load blocks in the form of an I-shaped friction plate. The friction plate has a left and a right recess each of which receives a chain. Each chain comprises the same number of interleaved links of uniform thickness, with the chains positioned out of phase with each other by one-half the pitch distance, i.e., the center of the pivot pins of one chain project to about halfway between the centers of two adjacent pivot pins of the other chain. One friction plate is engaged in top and bottom notches in the links in one chain and the adjacent friction plate is engaged in top and bottom notches in the links in the other chain.

The chain of the present invention, on the other hand, provides a strut type of power transmitting load block with two chains positioned in a side-by-side relationship and offset from each other. Each strut has a lateral or transverse width substantially equal to the overall transverse width of the two chains. A portion of each strut is securely carded in a passageway defined by toes provided on the links of one chain with the other portion of the strut, i.e., the free end of the strut, supported by the links of the other chain. The struts therefore enjoy a measure of lateral freedom of movement that enhances the overall durability of the struts. As a result, the chain is expected to be more durable. In addition, because the full-width chain includes two half-chains offset from each other it is expected to result in a decrease in the noise associated with the operation of the chain.

SUMMARY OF THE INVENTION

The present invention is directed to a chain for use in a variable pulley transmission. The chain includes two half-chains positioned in side-by-side relationship to each other and offset by one-half the pitch distance from each other. The half-chains, when positioned in a side-by-side relationship, define mean overall lateral or transverse width of the chain. Each half-chain includes inner links having a pair of spaced apart toes to define a passageway to receive a strut.

The strut has a transverse width substantially greater than the lateral width of each half chain and substantially the same as the full overall width of the chain. One half of the total number of struts provided for the chain are associated with the first half-chain with the remaining associated with the second half-chain. At least some of the struts associated with the first half-chain have a portion securely carded in the passageways of the links of the first half chain. At least some of the struts associated with the second half-chain have a portion securely carded in the passageways of the links of the second half-chain. When each half-chain and its associated struts are assembled in a side-by-side relationship, the struts are interlaced and the extending portion, i.e. , the free end, of the struts of one half-chain extend beyond the lateral width of the other half chain and are supported by the links in the other half-chain. Preferably, the free end of the strut substantially contacts and is supported by the area adjacent the outer flank of the links in the other half-chain. In this way, a phased chain suitable for a variable pulley transmission is easily assembled in a way that provides support for the struts across the entire transverse width of the chain.

In one embodiment of the invention, a chain for use in a variable pulley transmission comprises a first half-chain and a second half-chain positioned in a side-by-side relationship and offset with respect to each other. The first half-chain comprises a plurality of interlaced sets of inner links interleaved by a pair of retaining links. Each of the inner links and the retaining links have two apertures that are transversely aligned and connected by a pivot member to define a first lateral width. The inner links have a pair of spaced apart depending toes, each comprised of an inner flank and an outer flank. The toes define a continuous inner surface consisting of two inner flanks and a crotch. The toes also define a passageway to receive a portion of a strut that has another portion extending beyond the first lateral width of the first half-chain. Preferably, every other set or row of inner links has at its outermost position a special pivot member retaining link or end link that receives a pivot member, for example, a press-fit pin, to ensure the lateral integrity of the chain.

The second half chain also comprises a plurality of interlaced sets of inner links interleaved by a pair of retaining links. Preferably, the inner links and retaining links comprising the second half-chain are identical to the inner links and retaining links comprising the first half-chain. Each of the inner links and the retaining links have two apertures that are transversely aligned and connected by a pivot member to define a second lateral width. The inner links have a pair of spaced apart depending toes each comprised of an inner flank and an outer flank. The toes define a continuous inner surface consisting of two inner flanks and a crotch. The toes define a passageway to receive a portion of a strut that has another portion extending beyond the second lateral width of the second half-chain. Preferably, every other set or row if inner links has at its outermost position a special pivot member retaining link or end link that receives a pivot member for example, a press-fit pin, to ensure the lateral integrity of the chain. Preferably, the first half-chain and the second half-chain are identical.

The first and second half-chains and their associated struts are assembled by interlacing the struts of the first half-chain with the struts of the second half-chain. Preferably, the struts have a lateral width substantially equal to the overall transverse width of the first and second half chains. When the half-chains and their associated struts are assembled in a side-by-side relationship, the struts are interlaced and the extending portion, i.e., the free end of the strut, of each strut extends beyond the overall lateral width of the chains and are supported by the links in the other half chain. Preferably, the free end of the strut of the first half chain contacts and is supported by the area of the link adjacent the outer flank of the links in the second half-chain. Similarly, the free portion of the struts of the second half-chain contacts the area of the link adjacent the outer flank of the links in the first half-chain. In this way, full-width struts are provided and are supported across the overall transverse width of the chain.

DETAILED DESCRIPTION OF THE INVENTION AND PREFERRED EMBODIMENTS

Figure 1:
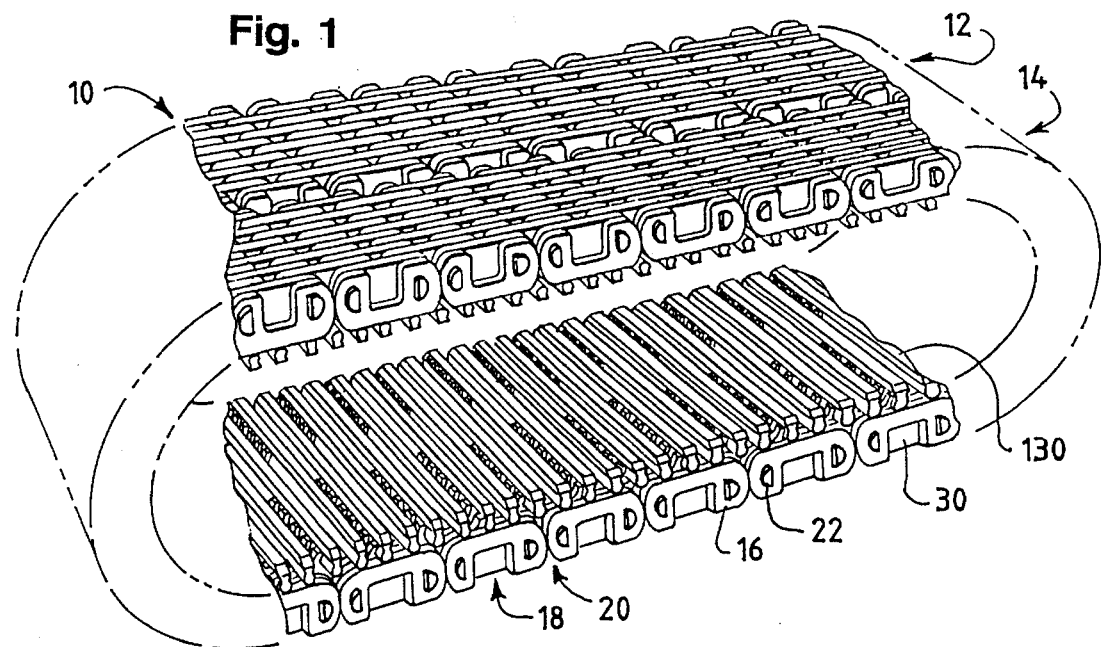
FIG. 1 is a perspective view of the chain of the present invention.

Turning now to the drawings, FIG. 1 generally illustrates a chain 10 of the present invention for use in a variable pulley transmission of the type schematically illustrated in U.S. Pat. No. 5,007,883 which is incorporated herein by reference.

The chain 10 of this invention comprises a first half-chain 12 and a second half-chain 14 disposed in a side-by-side relationship with the chains being offset from each other by one-half pitch. When assembled, the chain 10 has a transverse width substantially the same as the combined or overall transverse width of the first half-chain and the second half-chain. Although each half-chain may have any suitable transverse width, they preferably have an identical transverse width. More preferably, each half-chain is identical in construction. Each half-chain 12 and 14 includes a plurality of sets of retaining links 16 interleaved with sets of inner links 30. The inner links 30 are interlaced so that the apertures of one link set are transversely aligned with the apertures of the next adjacent set. In this way, a fixed, non-articulating row 18 and an articulating row are defined. In the non-articulating row 18, both of the apertures of a set of inner links are aligned with both of the apertures of the opposing retaining links. In the articulating row 20 one aperture of a set of inner links is aligned with one aperture of the opposing retaining links.

The retaining links 16 may take any form known in the art including that shown and described in U.S. application Ser. No. 08/196,310, filed Feb. 15, 1994 and assigned to the same assignee as the present application and incorporated herein by reference.

Pivot members 22 are fitted within the apertures of the retaining links 16 and the inner links 30 to form an endless chain. The pivot members can include a rocker joint, which may include a pin and a rocker as shown in, for example, U.S. Pat. No. 4,507,106 which is incorporated herein by reference. The pivot member may also include a single pin as shown and described in U.S. Ser. No. 07/961,077 now U.S. Pat. No. 5,334,111 assigned to the same assignee as the present application and incorporated herein by reference.

A load block or strut 130 is associated with each set of inner links to engage the flanges of the pulleys. The struts are a solid metal block that provide a great deal of strength, stability, and resistance to wear as the pulley transmission operates.

Figure 5:
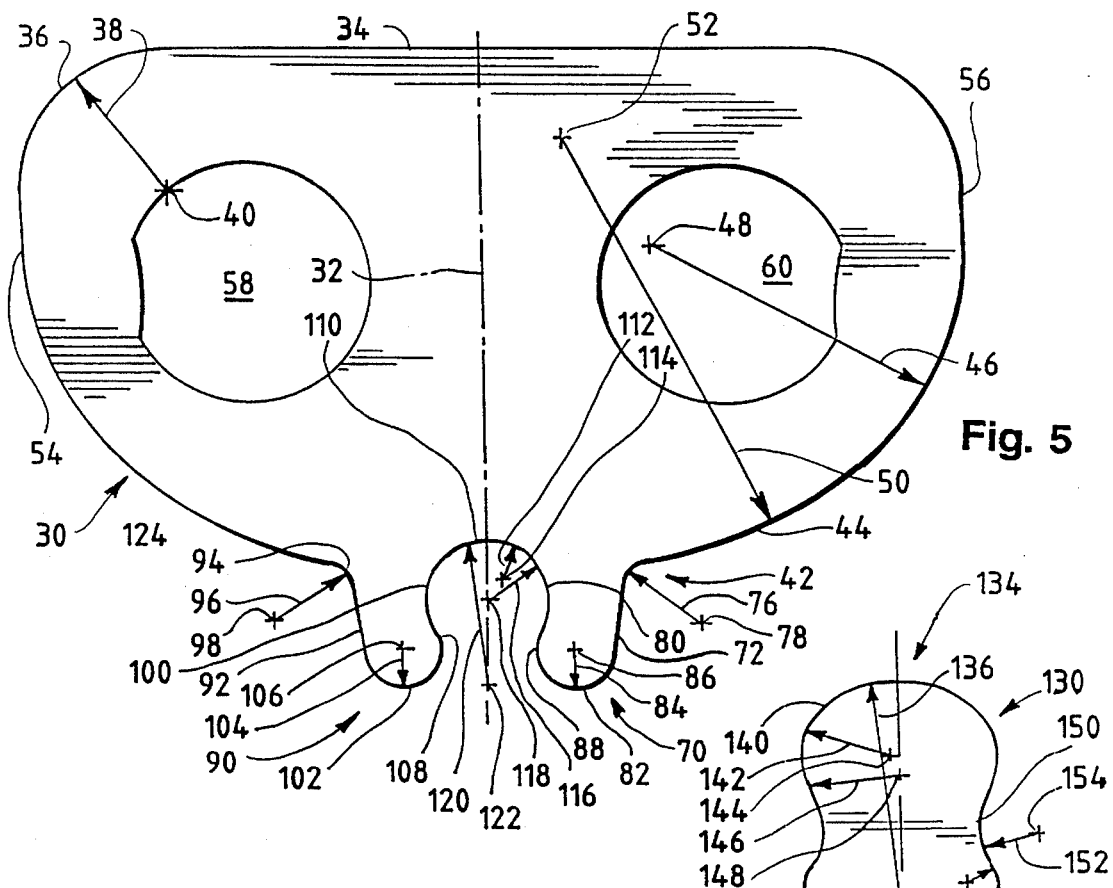
FIG. 5 is a side view of an inner link for use in the chain of FIG. 1.

Referring more particularly to FIG. 5, a side view of an inner link 30 for use in either the first half-chain or the second half-chain is illustrated. Although the particular configuration of the inner link shown in FIG. 5 has been found to be useful for the present invention, any configuration that accomplishes the purpose of the present invention may be used. Preferably, only a single inner link configuration is used to assemble the first and second half-chains resulting in a low cost and simple manufacturing process.

The inner link 30 is generally symmetrical about a vertical center line 32. The inner link comprises a top 34, preferably substantially horizontal, and a bottom 42 having two spaced apart depending toes 70 and 90 that define a passageway. The top and bottom are joined at sides 54 and 56 which are preferably, although not necessarily substantially vertical. As indicated above, the link has a pair of apertures 58 and 60 to receive a pivot member 22.

Figure 8:
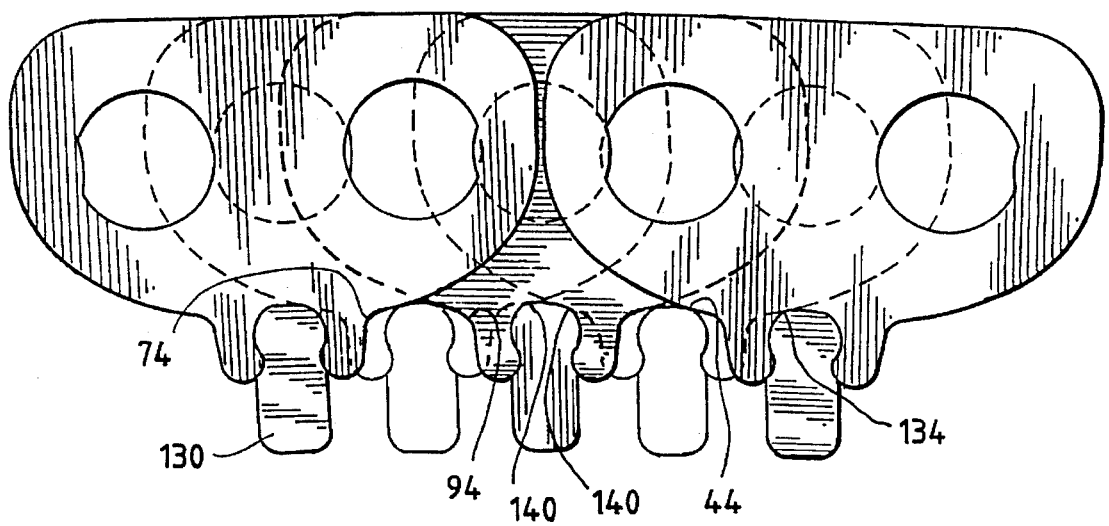
FIG. 8 is a side view of a portion of an assembled chain of FIG. 1 in a nearly horizontal orientation.
Figure 9:
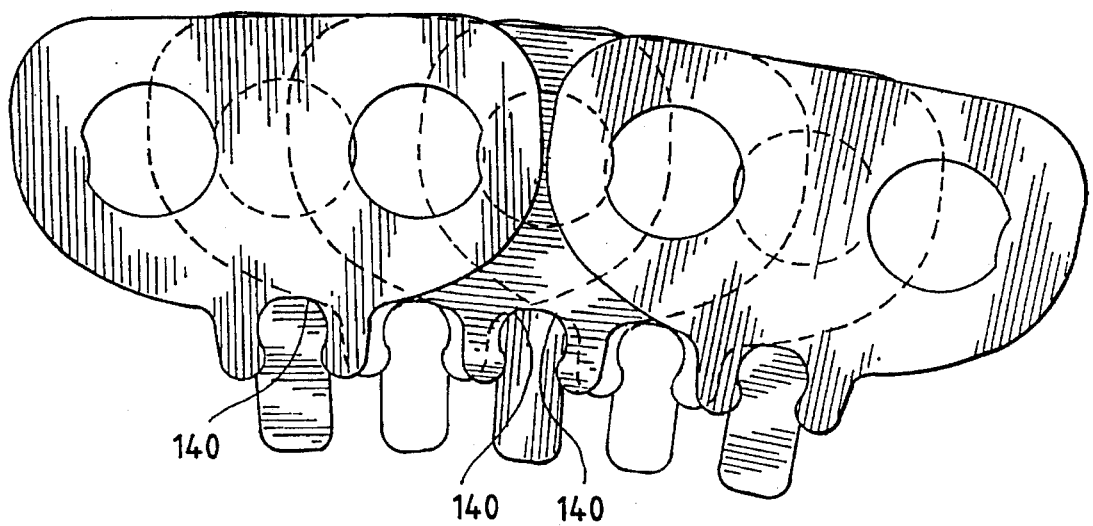
FIG. 9 is a side view of a portion of an assembled chain of FIG. 1 in a slightly articulated orientation.
Figure 10:
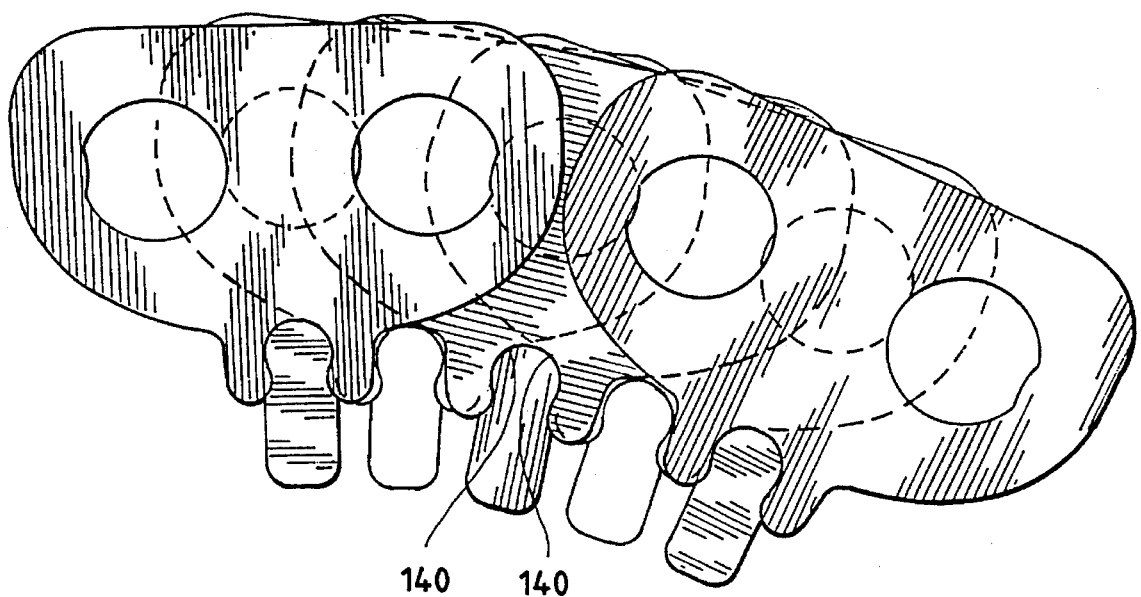
FIG. 10 is a side view of a portion of an assembled chain of FIG. 1 in a fully articulated orientation.

The top 34 is joined to each side through a surface 36 preferably rounded and defined by an arc 38 having its center point 40 within the body of the link, preferably located adjacent an edge of the aperture, only one of which is shown since the link is symmetrical. More preferably, the center point 40 is located on the edge of the aperture closest the surface 36. The sides 54 and 56 are joined to the bottom 42 and define a strut contact surface 44. The strut contact surface 44 of the link substantially contacts and supports the free end of the strut, as best seen in FIGS. 8–10 and as more fully described below. More particularly, the strut contact surface 44 is defined as the area located adjacent to and joined with the depending toes 70 and 90 and the sides 56 and 54. The strut contact surface 44 is preferably concave and is defined by an arc having its center point located within the body of the link 30. More preferably, the strut contact surface 44 is formed from an arc 50 having its center point 52 within the body of the link. In this more preferred embodiment, the strut contact surface 44 is joined with the sides 54 and 56 through a rounded concave surface formed from an arc 46 having its center point 48 within the aperture.

As noted above, the link includes two spaced apart depending toes. The depending toe 70 is symmetrical with depending toe 90 and both are disposed to extend in a direction toward the shafts in a variable pulley transmission when the chain 10 is properly positioned. The toe 70 is defined by an outer flank 72 and an inner flank 80 joined by a toe bottom 82. Preferably, the toe bottom 82 is rounded and formed from an arc 84 by having its center point 86 located within the toe. The outer flank 80 is joined to the strut contact surface 44. Preferably the outer flank is joined to the strut contact surface 44 through a convex surface 74 formed by an arc 76 having its center point 78 located outside the link 30.

Similarly, the toe 90 is defined by an outer flank 92 and an inner flank 100 joined by a toe bottom 102. Preferably, the toe bottom 102 is rounded and is formed from an arc 104 having its center point 106 located within the toe. The outer flank 92 is joined to the strut contact surface 44. Preferably, the outer flank is joined to the strut contact surface 44 through a convex surface 94 formed by an arc 96 having its center point 98 located outside the link 30.

The inner flanks 80 and 100 are acutely shaped and joined by a rounded crotch 110. Preferably, the crotch 110 is defined by a plurality of radii with at least one radius having its center point located on the vertical center line 32 of the link. Preferably, the crotch 110 is formed from three arcs with a first arc 112 having a center point 114, a second arc 116 having a center point 118 located on the center line 32, and a third arc 120 having a center point 122 located on the center line 32 and below the center point 118.

The toes 70 and 90 and their respective inside flanks 80 and 100 are spaced apart to define a passageway 124 for a strut 130. The configuration of the inside flanks and the rounded crotch result in the opposed toes forming a substantially circular passageway 124. The inside flanks 80 and 100 preferably have a projection 88 and 108, respectively, to define a restriction in the passageway. The restriction aids in carrying and retaining a portion of the strut.

Figure 6:
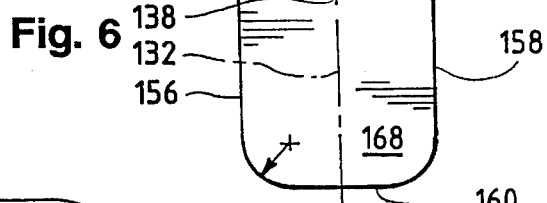
FIG. 6 is an end view of a strut for use in the chain of FIG. 1.

A load block or strut 130 is associated with each row of inner links 30 in each half-chain and is received in the passageway 124 defined by the opposed toes. It will be appreciated by one skilled in the art that a plurality of transverse passageways are formed in each half-chain by the interlacing of the inner links. In particular, each set of link rows, i.e., each non-articulating row and each articulating row, includes a transverse passageway that carries a portion of a strut. As best seen in FIG. 6, the strut 130 is symmetrical about a vertical center line 132 and has a top 134, two rounded link contacting surfaces 140, two grooves 150, a first side 156 and a second side 158, a bottom 160, and ends 168 that contact the flanges of the pulley surfaces.

The upper region of the strut, including the top 134 and the rounded contacting surface 140, is similar in shape as the passageway 124 and is only slightly smaller in size to allow the struts to be positioned in the passageway. Preferably, the top 134 is defined by an arc 136 having its center point 138 located on the vertical center line 132. Each rounded contacting surface 140 is formed from a plurality of arcs one of which has a center point located on the vertical center line. Preferably, the rounded contacting surface 140 is formed from a first arc 142 having a center point 144 that connects the top with the rounded surface, and a second arc 146 having a center point 148 located on the center line 132.

A groove 150 is provided between the rounded contacting surface and each substantially vertical side 156, 158. The groove is formed from an arc 152 having a center point 154 located outside the body of the strut. The groove is shaped to complement the projections 88 and 108 on the inner flanks of the toes so that the strut can be slidably received and retained within the passageway the link. In addition, when the strut is received in the passageway, relative vertical movement of the strut from the links is prevented due to the complimentary engagement of the restriction formed by the opposing projection 88 and 108 and the corresponding grooves 150 formed on the struts.

As noted above, the struts 30 of the present invention are preferably monolithic blocks that are stronger than the prior art load blocks that were formed from several plates and were positioned in adjacent relationship to form a load block. These prior art load blocks also contained a window or opening and the chain was positioned in the opening. The present struts are a solid piece and do not have an opening or window extending through the load block. The outside edges or ends 168 of the struts are shaped to engage the flanges of the pulleys of the transmission. It is therefore relatively easy to create a uniform end surface 168 for contacting the pulleys when the load block is a solid metal load block. If the plates of some of the prior art load blocks varied slightly in size or were positioned differently around the chain, slight variations could be present on the outside edges that were disposed to contact the pulleys. Such variations can result in an uneven outside surface for the load block. In this situation, not all of the plates that form the load block may be contacted by the pulleys. When this occurs there is uneven load sharing between the plates that form the load block and the load block is less effective in transferring torque between the pulleys and in resisting wear during use of the transmissions. The solid, monolithic blocks of the present invention eliminate the above deficiency of some of the prior art load blocks. Moreover, even though the struts of the present invention positively engage the links of each half-chain, they do not do so in a rigid manner so as to result in durability problems associated with prior art designs.

Moreover, the struts of the present invention are easy to position on the chain. The struts are positioned in the passageway 124 formed by the opposed toes 70 and 90 that extend from each inner link 30 of the chain. This is a much easier construction method than the prior art load blocks that required the chain to be positioned in an opening in the load block. The load blocks were held in place by pins that secured adjacent sets of links together. This prior art system essentially required the load blocks to be positioned on the chain during the formation of the chain. Such a structure is more difficult and expensive to utilize than the load blocks of the present invention. Accordingly, the present invention provides a chain for a variable pulley transmission that is much cheaper and easier to assemble than many prior art chains.

As noted above, each strut is associated with each row of inner links in each half-chain. The struts have a lateral or transverse width that is greater than the transverse width of the half-chain that carries the strut. Preferably, the strut has a lateral width substantially equal to the full-width chain. In other words, the strut preferably has a lateral width substantially equal to the overall transverse width of the first and second half-chains. As a result, only a portion of each strut is carded by the links in the passageways of each half-chain. The other portion of the strut extends across the transverse width of the other half-chain and is not carded in the passageways in the other half-chain but is substantially supported by the links at the strut contact surface 44.

Figure 2:
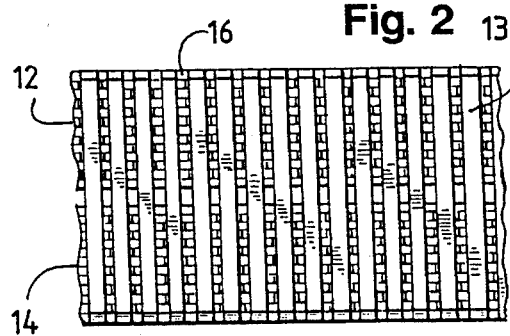
FIG. 2 is a bottom view of a portion of an assembled chain of FIG.1.
Figure 3:
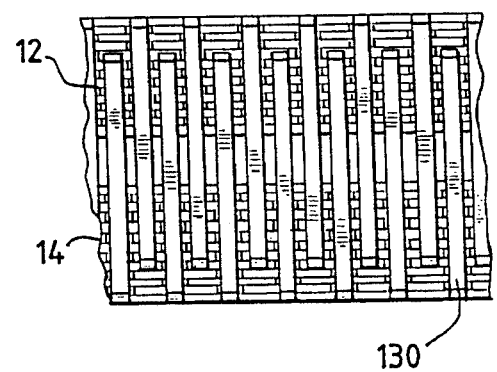
FIG. 3 is a bottom view of a portion of two half-chains to be assembled to form the chain of FIG. 1.
Figure 4:
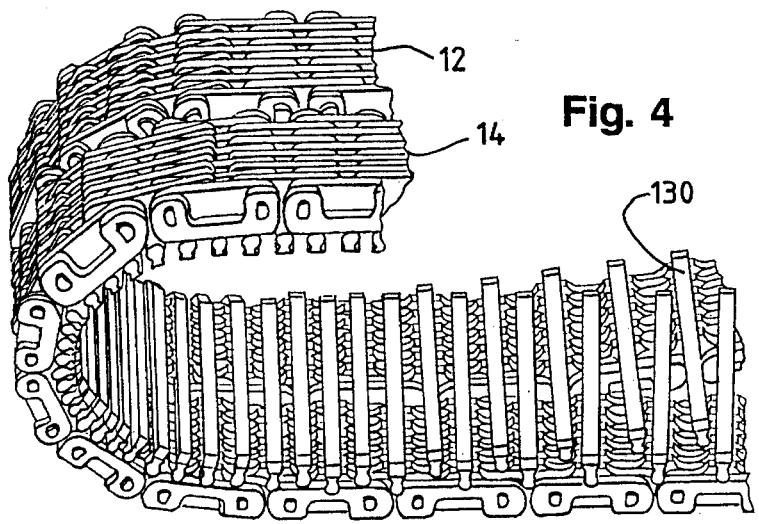
FIG. 4 is a perspective view of a portion of the two half-chains of FIG. 1 being brought together and being partially assembled.

Referring to FIGS. 2 through 4, it will be understood that the first half-chain includes articulating row struts and non-articulating row struts and the second half-chain also includes articulating row struts and non-articulating row struts. As the first and second half-chains are assembled, the struts of the first half-chain are interlaced with the struts in the second half-chain. Because the first and second half-chain are offset by one-half pitch, a non-articulating row strut from the first half-chain is interleaved with a non-articulating row strut and an articulating row strut on the second half-chain. It will therefore be understood that the non-articulating row struts in the first half-chain are disposed in substantially the same transverse plane as the aligned apertures of the links in the non-articulating row of the second half-chain. In addition, the articulating struts in the first half-chain are disposed in substantially the same transverse plane as the aligned apertures of the links in the non-articulating row of the second half-chain. Consequently, each link in the non-articulating row in the second half-chain is associated with three struts: a non-articulating row strut of the first half-chain, chain a non-articulating row strut of the second half-chain, and an articulating row strut of the first half-chain, in order.

Likewise, the non-articulating row struts and the articulating row struts of the second half-chain are disposed in substantially the same transverse plane as the aligned apertures of the links in the non-articulating row in the first half-chain. As a result, each link in the non-articulating row in the first half-chain is associated with three struts: an articulating link row strut of the second half-chain, a non-articulating row strut of the first half-chain, and a non-articulating link row strut of the second half-chain, in order.

The assembly of the two half-chains will therefore result in a strut that is associated with one half-chain being flanked by two struts associated with the other half-chain, each of which will be located adjacent to each of the toes that define the passageway carrying the strut associated with the one half-chain.

It is known by those skilled in the art that the load blocks and struts in chains used in variable pulley transmissions experience considerable compressive loads. It will also be appreciated by one skilled in the art that since each half-chain carries only a portion of each strut, the strut will be cantilevered unless it is supported on its free end. As a result of the cantilevering, the durability and life of the chain may be decreased. According to the present invention, however, the particular configuration of the inner links 30 and the struts 130 provides support for the free end of the struts.

In particular, and referring to FIGS. 2 through 4, each half-chain carries within the passageway defined by the depending toes, a portion of each strut and when assembled the struts carried by the first half-chain are interlaced with the struts carried by the second half-chain. The free end of each strut on the first half-chain contacts the links in the second half-chain in the area adjacent the outer flanks of the toes. Likewise, the free end of each strut on the second half-chain contacts the links in the first half-chain in the area adjacent the outer flanks of the toes.

Figure 7:
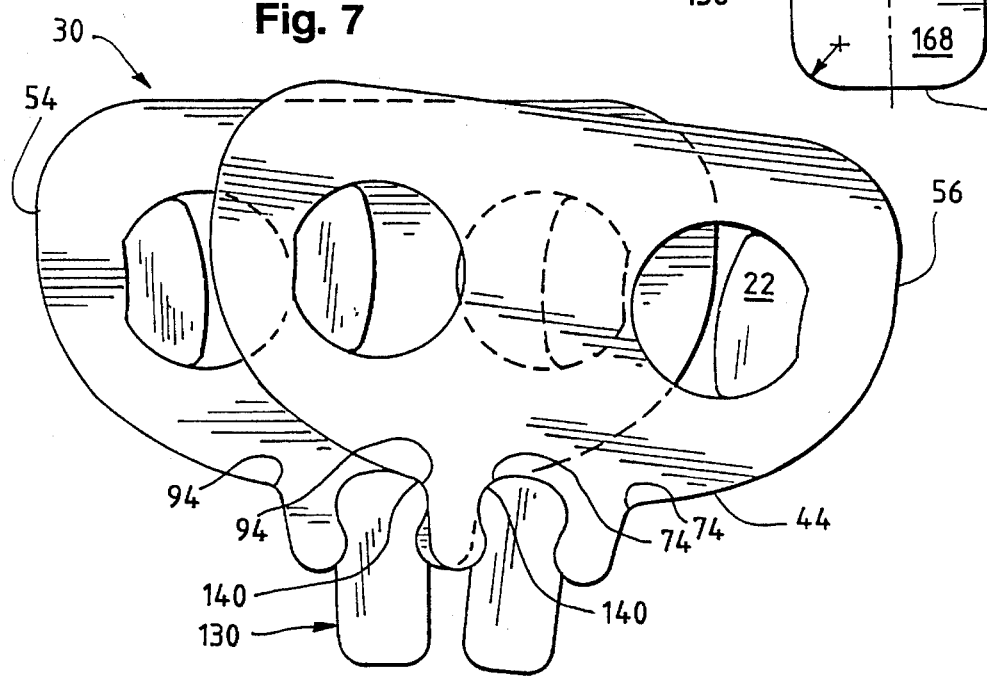
FIG. 7 is a side view of two links in an articulated position showing the contact between alternate struts and chain links.

Referring more particularly to FIG. 7, a portion of an assembled chain is shown with an inner link from the first half-chain is shown with an inner link from the second half-chain with the chain being in a fully articulated orientation. In this fully articulated orientation it will be appreciated that the free end of the strut from the first half-chain contacts and is substantially supported by the strut contact surface 44 of the link which is adjacent the outer flank of the toes on the links in the second half chain. In particular, at least a portion of the upper region of the strut from the first half-chain contacts the convex surface 74, 94 on the links of the second half-chain. Preferably, when the chain is fully articulated at least a portion of the top of the strut from the first half-chain contacts, in a complementary fashion, the convex surfaces 74, 94 on the links in the second half-chain.

Referring now to FIGS. 8–10, a portion of an assembled chain is shown as it moves from a nearly horizontal position to a fully articulated position. It will be understood that when the chain is in the nearly horizontal position, the top of the free end of the strut 134 will substantially contact and be substantially supported at the strut contact surface 44 of two adjacent links. In particular, at least a portion of the contacting surface 140 substantially contacts the strut contact surface 44 of two adjacent links.

More preferably, the free end of each strut will be supported at two points, i.e., two contacting surfaces 140. In this manner, one contacting surface 140 of a non-articulating row strut in the first half-chain contacts a strut contact surface on the non-articulating row links in the second half-chain. The other contacting surface 140 of a non-articulating row strut in the first half-chain contacts a strut contact surface on the articulating row links in the second half-chain. As a result, each strut will be fully supported across its transverse width.

In addition, the location of the contacting surface 140 on the top of the strut 134 changes as the chain moves from an unarticulated to an articulated configuration, as best seen in FIGS. 8 through 10. As the chain articulates, however, the free end of the strut remains in substantial contact along the strut contact surface 44 until it reaches the fully articulated position shown in FIGS. 7 and 10 where the contacting surfaces contacts the convex surfaces. It is to be understood that, although it is more preferred to provide a two point contacting surface on the free end of the strut, three, four or a greater number of contacting surfaces may be provided.

Although the present invention has been described as having two half-chains to form a single full width chain, the principles of the invention may be used to provide a full width chain including more than two half-chains. For example, it may be possible to provide a third chain disposed between the two half-chains described above. This third chain may be in phase with either the first or second half chain and may or may not carry struts.

Those skilled in the art to which the invention pertains may make other modifications and embodiments employing the principles of this invention without departing from its spirit or essential characteristics, particularly upon considering the foregoing teachings, The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain comprising:
   a. a first half-chain having
      i. a plurality of interlaced sets of links with each set having a plurality of transversely arranged links to define a first lateral width,
      ii. pivot members joining the adjacent sets of links to form an endless loop,
      iii. a pair of toes extending downward from each link in at least some sets of links and defining a passageway, each toe being defined by an inner flank and an outer flank,
      iv. a plurality of struts with a portion of their length positioned in the passageway and another portion extending beyond the first lateral width; and,
   b. a second half-chain having
      i. a plurality of interlaced sets of links with each set having a plurality of transversely arranged links to define a second lateral width,
      ii. pivot members joining the adjacent sets of links to form an endless loop,
      iii. a pair of toes extending downward from each link in at least some sets of links and defining a passageway, each toe being defined by an inner flank and an outer flank,
      iv. a plurality of struts with a portion of their length positioned in the passageway and another portion extending beyond the second lateral width, wherein when the first and the second half-chains are placed side-by-side and offset by a portion of one pitch length of the chain, the extending portion of the struts of the first half-chain is interleaved with the extending portion of the struts of the second half-chain and each strut extends across the overall lateral width of the first and second half-chains with at least a part of the extending portion of the struts of the first half-chain substantially supported by a strut contact surface of the link adjacent the outer flank of the links in the second half-chain and with at least a part of the extending portion of the struts of the second half-chain substantially supported by the strut contact surface of the link adjacent the outer flank of the links in the first half-chain.

2. The power transmission chain of claim 1 wherein each link includes a pair of downward extending and opposed toes with each toe defined by an inner flank and an outer flank, wherein the inner flanks have an arcuate shape and are joined together by a curved crotch.

3. The power transmission chain of claim 2 wherein the crotch is defined by a plurality of radii with the center point of at least one radii lying on a vertical center line of the link.

4. The power transmission chain of claim 3 wherein the inner flanks define two opposing projections that engage longitudinal grooves provided on an upper end of the struts.

5. The power transmission chain of claim 2 wherein the strut contact surface of the links include a concave surface.

6. The power transmission chain of claim 5 wherein the concave surface of the strut contact surface is defined by at least one radius having a center point within the body of the link.

7. The power transmission chain of claim 6 wherein the strut contact surface is joined to the outer flank through a convex surface.

8. The power transmission chain of claim 7 wherein a part of the extending portion of the struts of the first half-chain contacts the convex surface of the links in the second half-chain and a part of the extending portion of the struts of the second half-chain contacts the convex surface of the links in the first half-chain when the chains are in a fully articulated position.

9. A power transmission chain of a variable pulley transmission comprising:
   a. a first half-chain having
      i. a plurality of interleaved sets of links with each set having a plurality of transversely arranged links to define a first lateral width,
      ii. pivot members joining the adjacent sets of links to form an endless loop,
      iii. a pair of toes extending downward from each link in at least some sets of links and defining a passageway, each toe being defined by an inner flank and an outer flank,
      iv. a plurality of struts with a portion of their length positioned in the passageway and another portion extending beyond the first lateral width, each strut having edge surfaces for contacting the pulleys of the transmission; and,
   b. a second half-chain having
      i. a plurality of interleaved sets of links with each set having a plurality of transversely arranged links to define a second lateral width,
      ii. pivot members joining the adjacent sets of links to form an endless loop,
      iii. a pair of toes extending downward from each link in at least some sets of links and defining a passageway, each toe being defined by an inner flank and an outer flank,
      iv. a plurality of struts with a portion of their length positioned in the passageway and another portion extending beyond the second lateral width, each strut having edge surfaces for contacting the pulleys of the transmission, wherein when the first and the second half-chains are placed side-by-side and offset by a portion of one pitch length of the chain, the extending portion of the struts of the first half-chain are interleaved with the extending portion of the struts of the second half-chain and each extend across the overall lateral width of the first and second half-chains with at least a part of the extending portion of the struts of the first half-chain substantially supported by a strut contact surface of the outer flank of the links in the second half-chain and the extending portion of the struts of the second half-chain substantially supported by the strut contact surface of the outer flank of the links in the first half-chain, wherein the extending portion of the struts remain in substantial contact with the strut contact surface as the chains travel from a substantially non-articulated orientation to an articulated orientation.

10. The power transmission chain of claim 9 wherein said inner flanks have an arcuate shape and are joined together by a curved crotch the crotch, is defined by a plurality of radii with the center point of at least one radii lying on a vertical center line of the link.

11. The power transmission chain of claim 10 wherein the inner flanks define two opposing projections that engage longitudinal grooves provided on an upper end of the struts.

12. The power transmission chain of claim 9 wherein the strut contact surface connects the outer flanks with a side of the link.

13. The power transmission chain of claim 12 wherein the strut contact surface is concave and is defined by a radius having a center point within the body of the link.

14. The power transmission chain of claim 13 wherein the strut contact surface is joined to the outer flank through a convex surface.

15. The power transmission chain of claim 14 wherein a part of the extending portion of the struts of the first half-chain contact the convex surface of the links in the second half-chain and a part of the extending portion of the struts of the second half-chain contact the convex surface of the links in the first half-chain when the chains are in a fully articulated position.

* * * * *